United States Patent
Baba

(10) Patent No.: US 6,582,165 B1
(45) Date of Patent: Jun. 24, 2003

(54) EDGE TIP CHANGING TYPE ROTARY CUTTING TOOL

(75) Inventor: Ryousuke Baba, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/048,118

(22) PCT Filed: Jul. 28, 2000

(86) PCT No.: PCT/JP00/05092
§ 371 (c)(1),
(2), (4) Date: Jan. 28, 2002

(87) PCT Pub. No.: WO01/08841
PCT Pub. Date: Feb. 8, 2001

(30) Foreign Application Priority Data

Aug. 2, 1999 (JP) ............................................. 11-218401

(51) Int. Cl.⁷ .............................. B23B 51/00; B23C 5/22
(52) U.S. Cl. ............................ 408/233; 407/42; 407/40; 408/231
(58) Field of Search ............................... 408/233, 181, 408/227, 239, 231, 238; 407/42, 34, 40, 113, 53, 54

(56) References Cited

U.S. PATENT DOCUMENTS

| | | | | |
|---|---|---|---|---|
| 3,333,489 A | * | 8/1967 | Mossberg | 408/60 |
| 3,966,350 A | * | 6/1976 | Benjamin | 408/233 |
| 4,423,989 A | * | 1/1984 | Kress et al. | 408/197 |
| 4,493,596 A | * | 1/1985 | Grunsky et al. | 408/233 |
| 4,525,109 A | * | 6/1985 | Bylund | 407/36 |
| 4,566,828 A | * | 1/1986 | Reinauer | 407/48 |
| 4,595,322 A | * | 6/1986 | Clement | 408/230 |
| 5,064,316 A | * | 11/1991 | Stojanovski | 407/40 |
| 5,108,234 A | * | 4/1992 | Stojanovski | 407/40 |
| 5,474,407 A | * | 12/1995 | Rodel et al. | 408/227 |
| 5,971,671 A | * | 10/1999 | Mina | 407/42 |

FOREIGN PATENT DOCUMENTS

| | | |
|---|---|---|
| JP | 64-1248 | 1/1989 |
| JP | 2-39810 | 3/1990 |
| JP | 6-53012 | 7/1994 |
| JP | 8-252714 | 10/1996 |
| JP | 8-294814 | 11/1996 |
| JP | 10-249626 | 9/1998 |
| JP | 11-104913 | 4/1999 |

* cited by examiner

Primary Examiner—Steven C. Bishop
(74) Attorney, Agent, or Firm—McDermott, Will & Emery

(57) ABSTRACT

A tip-changeable rotary cutting tool in which a tip having axis-symmetrically arranged cutting edges is inserted into a groove that cuts across the center of the holder's front end is improved in machining precision, product precision, and machining performance. Forward-facing oblique locking faces 8 are provided axis-symmetrically at the front ends of jaws 3 of a holder 1. The locking faces 8 cross each other at a position a certain distance (one-third to two-thirds the width of the tip) away from the front end of the tool to lock backward-facing engaging faces 9 provided at some longitudinal midpoint position of a tip 5. The shortened distance between the cutting edge 6 and the locking position suppresses the runout deviation of the tip, decreasing the displacements of the cutting edges due to the runout deviation. A large chip pocket can also be provided.

9 Claims, 5 Drawing Sheets

EDGE TIP CHANGING TYPE ROTARY CUTTING TOOL

TECHNICAL FIELD

The present invention relates to a tip-changeable rotary cutting tool.

BACKGROUND ART

FIGS. 9 and 10 show a conventional tip-changeable rotary cutting tool. The tool comprises a columnar holder 1 having at its front-end a groove 2 that cuts across its center, a tip 5 inserted into the groove 2 and supported by jaws 3 at the front end of the holder, and cutting edges 6 provided axis-symmetrically at the edge of the tip 5. The jaws 3 are tightened by clamping screws 7 that penetrate through the holes in the tip 5. This type of tool has been disclosed by the published Japanese patent and utility-model applications Tokukoushou 64-1243, Jitsukaihei 6-53012, Tokukaihei 8-252714, Tokukaihei 8-294814, etc. The tool shown in FIGS. 9 and 10 are a ball-end mill. There are various end mills and drills having a structure similar to that of the ball-end mill.

The present applicant has proposed a cutting tool in the published Japanese patent application Tokuganhei 9-269513. With this cutting tool, each of the two main faces of the tip has a level-changing face that crosses each other in the vicinity of the front end of the tip when viewed in a projected plan view. The level-changing face extends from the vicinity of the center of the front end of the tip toward the side-face of the cutting edge. The level-changing faces are locked by the jaws at the front end of the holder.

The conventional tool shown in FIGS. 9 and 10 supports the rear part of the tip 5 with locking faces (reference faces) 4 of the holder 1. Because the locking faces 4 are far from the cutting edges 6, the tip 5 tends to deviate, pivoting on a point in contact with the locking faces 4 while the tool is cutting. The deviation (runout deviation) readily increases the displacement of the cutting edges 6, reducing the machining precision.

The inside spacing of the groove 2 is restricted in order to secure the stiffness of the jaws 3, so it is difficult to increase the thickness of the tip. This thickness limitation prevents the design of cutting edges forming an optimum shape, such as an S shape when viewed from the front (the S shape is considered to be desirable for a ball-end mill). As a result, most cutting edges have a linear shape with a limitation of two in number. This thickness limitation makes it difficult to improve cutting performance and machining efficiency.

Furthermore, many of the conventional tools have at the innermost portion of the groove the locking faces 4 forming a V shape, an inverted V shape, a circular-arc shape, or a jagged shape. These complex shapes make it extremely difficult to machine the locking faces, hindering the increase of the product precision.

On the other hand, the tool which the present applicant has proposed in Tokuganhei 9-269513 solves the above-described problem because the level-changing faces on the two main faces of the tip are locked by the front ends of the jaws of the holder. This tool, however, locks the tip at the cutting faces for the cutting edges, so it is difficult to provide a large chip pocket. As mentioned above, the level-changing face extends from the vicinity of the center of the front end of the tip toward the side face of the cutting edge. Therefore, the number of cutting edges cannot be increased (an increase in the number increases the machining efficiency). Moreover, each of the two main faces of the tip has a level-changing face. This partial irregularity prevents the tip from being parallel to the supporting plane, so the tip cannot be placed stably on the plane. Consequently, it is difficult to machine the level-changing faces to be locked by the jaws.

The present invention aims to offer a tip-changeable rotary cutting tool that is free from the above-described problems.

DISCLOSURE OF THE INVENTION

In solving the above-described problems, the present invention targets a tip-changeable rotary cutting tool having the following structure:

(a) a holder has at its front end a groove cutting across the center of the holder;

(b) a tip having axis-symmetrically arranged cutting edges is inserted into the groove;

(c) the holder has jaws formed on opposite sides of the groove;

(d) the tip is tightly sandwiched between the jaws; and (e) the tip can be removed from the jaws for replacement.

The tip-changeable rotary cutting tool of the present invention has the following features:

(a) each of the jaws has a locking face at its front end;

(b) the locking faces face forward obliquely;

(c) each of the two main faces of the tip has an engaging face;

(d) the engaging faces protrude from the tip such that they increase the thickness of the tip;

(e) the engaging faces face backward obliquely; and (f) the locking faces lock the engaging faces.

In the above description, the term "forward" is used to mean the direction toward the front end of the holder, and the term "backward" is used to mean the opposite direction.

It is particularly desirable that the holder have the following structure:

(a) the locking face of one jaw and the locking face of the other jaw cross each other at a position a specific distance away from the front end of the tool when viewed in a plan view of the holder;

(b) the specific distance is defined as about one-half the width of the tip;

(c) the two locking faces cross each other at an angle of about 60 to 120 degrees; and (d) the two locking faces lock the engaging faces each formed on the two main faces of the tip such that they can be engaged with the corresponding locking faces.

In addition, the tip's front-end portion from the engaging faces to the cutting edges can have a thickness larger than that of the tip's portion to be inserted into the groove. Furthermore, the tip's portion to be inserted into the groove can have at least one projected part (machining-stabilizing part) having the same height as that of the tip's front-end portion. These structures enable the design of the cutting edges to have an optimum shape and the increase of the number of cutting edges.

Because the tool of the present invention locks the tip at the two main faces of the tip, the fulcrum of the runout deviation of the tip (locking portion by the locking face) moves closer to the cutting edges. Consequently, while the cutting is performed, the angular moment exerted on the tip is decreased. This decrease suppresses the runout deviation of the tip. A significantly short distance between the locking portion and the cutting edge decreases the displacements of the cutting edge due to the runout deviation, enabling high-precision machining.

Because the locking faces are provided at the front ends of the jaws, the machining of the locking faces is simplified with a possible increase in the product precision. The position of the locking faces is shifted toward the rear in comparison with that of the tool stated in Tokuganhei 9-269513, so a large chip pocket can be provided.

Because two locking faces slanting in opposite directions are provided axis-symmetrically at the front ends of the jaws, the thickness of the tip's portion where the cutting edges are formed can be increased without restriction. This increased thickness enables the design of the cutting edges to have a shape superior in cutting performance. Furthermore, it is possible to provide projected portions in the direction to increase the thickness. When cutting edges are provided at the projected portions, the total number of cutting edges can be increased. Because two locking faces are slanted in opposite directions, the tip can secure a centripetal effect when it is set.

In addition, the tip having a machining-stabilizing part can be set stably on the supporting plane. Consequently, the engaging faces of the tip can be machined stably with high precision and at low cost. The machining-stabilizing part can also be used for ensuring the set direction of the tip. As a result, the dimensional precision of the rotary cutting tool can be increased as a whole.

SIGNS USED IN THE DRAWINGS

Figure 1:
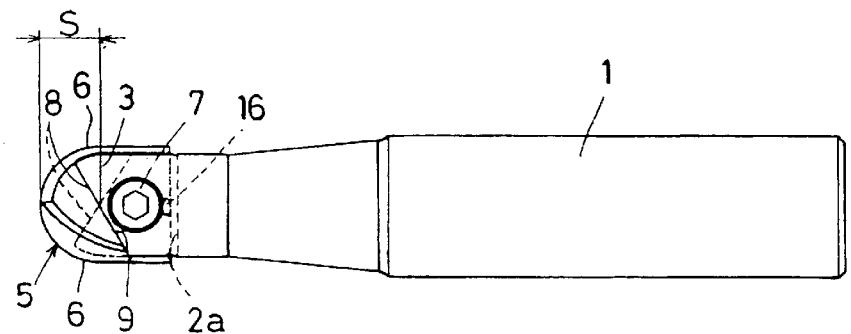
FIG. 1 is a plan view of a ball-end mill as an embodiment of the present invention.

The signs used in the drawings denote the individual members as follows: 1: holder, 2: groove, 2a: innermost portion, 3: jaw, 4: locking face, 5, 15, 25, 35: tip, 6: cutting edge, 7: clamping screw, 8: locking face of the present invention, 9: engaging face, 10: inserting portion, 11: cutting face, 12: through hole in a tip, 12a: hole in a holder, 13: projected portion, 14: super hard material, 16: machining-stabilizing part, 17: groove for a machining-stabilizing part.

BEST MODE FOR CARRYING OUT THE INVENTION

The present invention is explained below by referring to the accompanying drawings. In the drawings, the same member or a similar member bears the same sign so that duplicated explanations can be avoided.

FIGS. 1 to 5(b) show an embodiment of the rotary cutting tool of the present invention. The tool shown in these figures is a ball-end mill comprising a columnar holder 1, a tip 5, and a clamping screw 7. The holder 1 has at its front end a groove 2 cutting across its center. The groove 2 has a straight innermost portion 2a, which facilitates the machining. The holder 1 has jaws 3 at its front end. The jaws 3 are formed on opposite sides of the groove 2. Locking faces 8 facing forward obliquely are formed at the front end of the holder 1 by obliquely cutting the front ends of the jaws 3.

Because the two locking faces 8 slant in opposite directions at the front ends of the jaws 3, the tip can secure a centripetal effect. As shown in FIG. 5(a), the two locking faces 8 cross each other at a position a certain distance away from the front end of the tool. Although the two locking faces 8 slant in opposite directions, both faces have no machining restrictions. Therefore, they can be machined by lathe turning or grinding without difficulty. It is desirable that the distance between the front end of the tool and the cross point of the two locking faces 8 (shown as S in FIGS. 1 and 4(a)) be about one-half the width of the tip 5. Nevertheless, the distance S may vary in the range of one-third to two-thirds the tip width.

The tip 5 is provided with two axis-symmetric cutting edges 6. The tip 5 has two backward-facing engaging faces 9, which are to be engaged with the corresponding locking faces 8. The engaging face 9, provided at each of the two main faces of the tip, protrudes from the tip such that it increases the thickness of the tip. As shown in FIG. 4(b), the thickness t of the portion of the tip 5 from the engaging faces 9 to the cutting edges is larger than the thickness $t_1$ of an inserting portion 10, which is to be inserted into the groove 2. In addition, cutting faces 11 are formed by lowering the end-face portions of the tip along the cutting edges 6. As shown in FIGS. 4(a) and 4(d), the inserting portion 10 is provided with a through hole 12, through which the clamping screw 7 penetrates.

When the tip 5 is inserted into the holder 1, the engaging faces 9 engage with the locking faces 8 at the front end of the holder, positioning the tip 5. Next, the clamping screw 7 is inserted into the hole 12 to clamp the opposed jaws 3. Thus, the tip 5 is tightly sandwiched between the two jaws, and locked.

Figure 2:
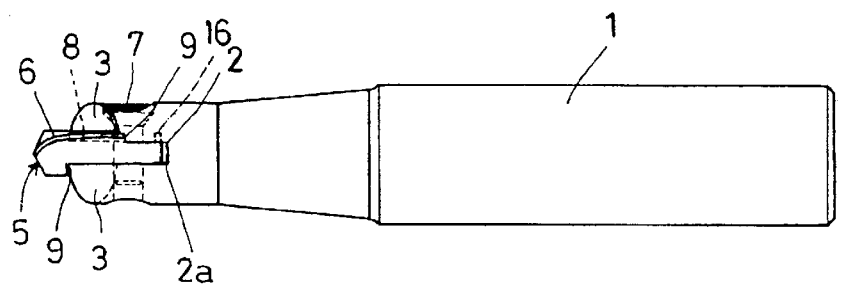
FIG. 2 is a side view of the ball-end mill shown in FIG. 1.
Figure 3:
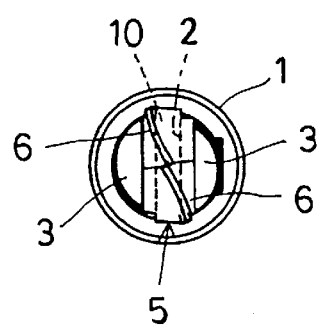
FIG. 3 is a front view of the ball-end mill shown in FIG. 1.
Figure 4:
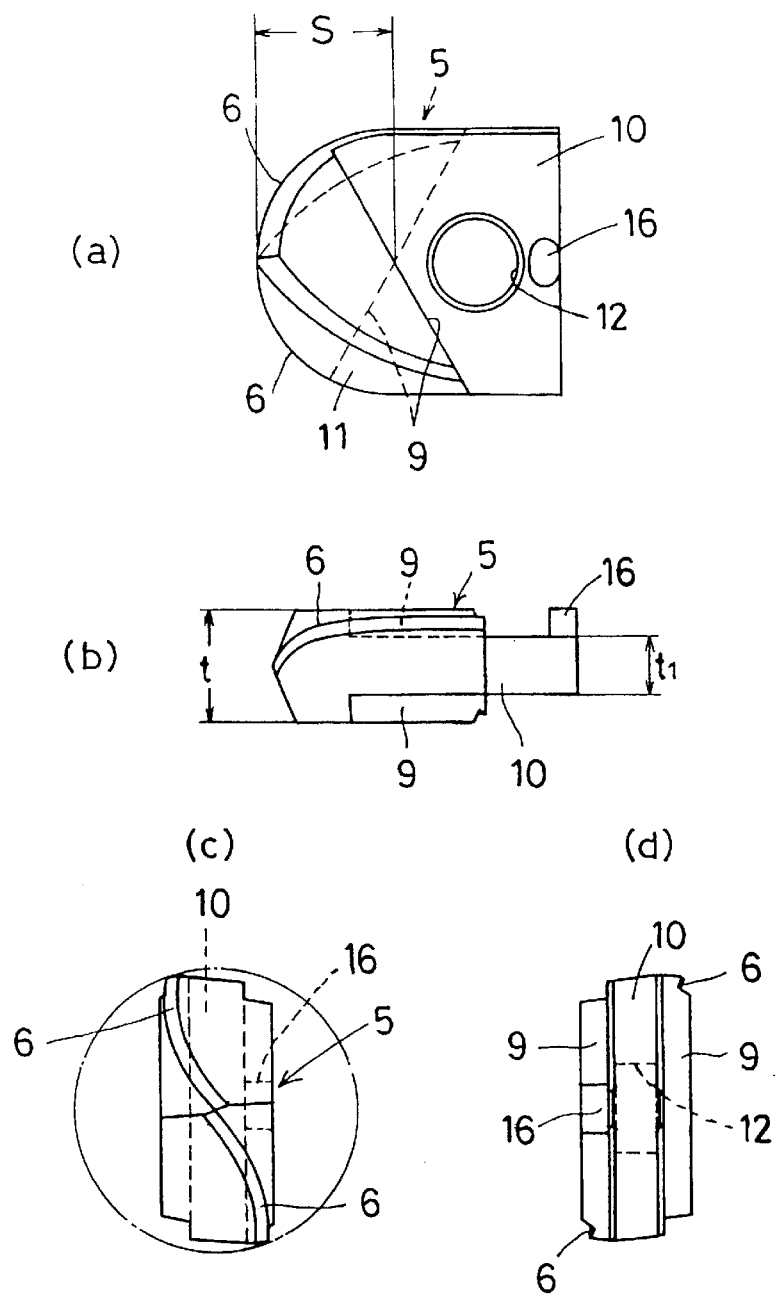
FIG. 4(a) is a plan view of a tip to be inserted into the ball-end mill shown in FIG. 1.
FIG. 4(b) is a side view of the tip.
FIG. 4(c) is a front view of the tip.
FIG. 4(d) is a rear view of the tip.
Figure 5:
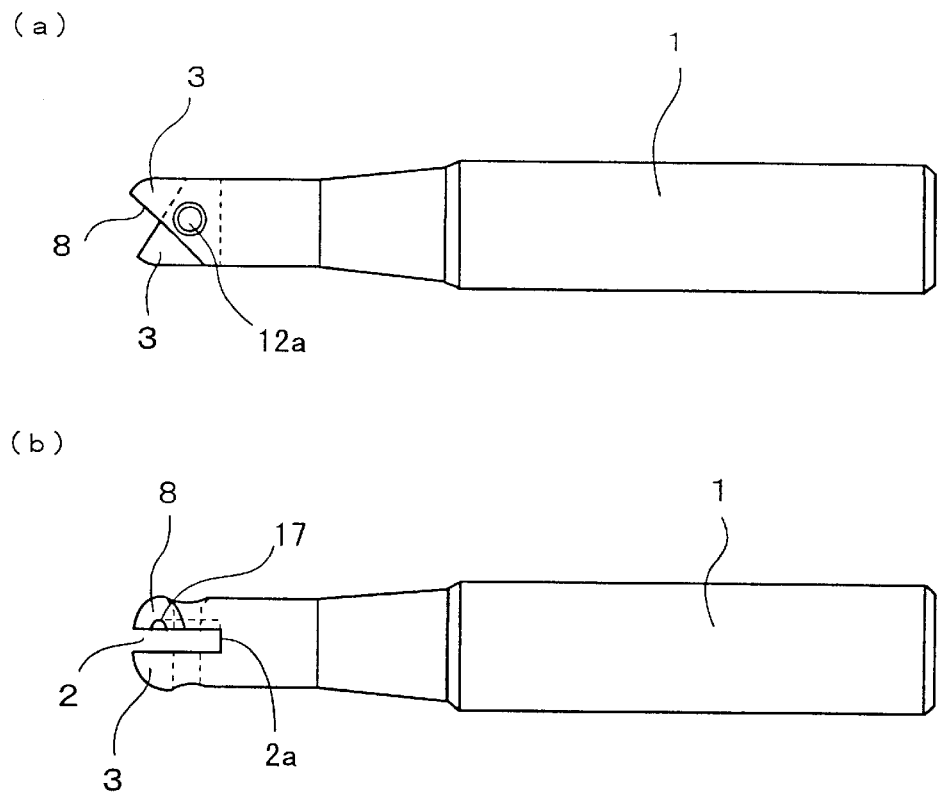
FIG. 5(a) is a plan view of a holder as an embodiment of the present invention.
FIG. 5(b) is a side view of the holder.

In this state of the tool, the rear end of the tip 5 is not in contact with the innermost portion 2a of the groove 2 as shown in FIG. 2. Therefore, while the cutting is performed, the thrust exerted on the tip 5 is sustained by the locking faces 8 located closely to the cutting edges. As a result, the runout deviation of the tip can be suppressed, and the displacements of the cutting edges can be reduced.

Furthermore, the tip 5 can have an increased thickness at the portion close to the cutting edges over conventional tips by the amount of $(t-t_1)$. Consequently, it is possible to provide cutting edges forming an S shape when viewed from the front. In this shape, two cutting edges are joined smoothly to each other. The S shape is considered to be desirable for a ball-end mill. The locking faces 8 at the front end of the holder are protected by the tip 5, without being damaged by chips.

FIGS. 5(a) and 5(b) show a holder to be used in combination with the tip shown in FIGS. 4(a) to 4(b). The holder has a hole 12a for the clamping screw 7. The holder is provided with a groove 17 through which a machining-stabilizing part 16 (see FIG. 4(b)) passes. Because the groove 17 is provided at only one of the jaws 3, the tip cannot be inserted into the holder the other way around.

The present inventors produced a ball-end mill using the tip shown in FIGS. 4(a) to 4(d) and the holder shown in FIGS. 5(a) and 5(b). The performance of the mill was confirmed by the cutting test described below. The mill had the following dimensions:

Diameter of the ball nose: Φ=20 mm

Thickness t: 7 mm

Thickness $t_1$: 4.5 mm

Diameter of the jaw portion of the holder: Φ=17.5 mm

Total length of the holder: 140 mm

Diameter of the chuck portion of the holder: Φ=25 mm

Crossing angle of the locking faces: 100 degrees

Distance S: varied

S50C steel materials stipulated in the Japanese Industrial Standard were machined to examine the damping status and the machining status. The machining was carried out under the following conditions:

Number of revolutions: 3,000 rpm

Feed: 0.15 mm per cutting edge

Depth of cut: 0.5 mm

Width of cut: 0.5 mm

The obtained test results are shown in Table 1. In Table 1, the sign "⊚" signifies "excellent," "○" signifies "satisfactory," "Δ" signifies "acceptable," and "X" signifies "unsatisfactory." Sample Nos. 3 to 7 were satisfactory in clamping status and machining status.

TABLE 1

| Sample No. | S (mm) | Clamping status | | Machining status | |
| --- | --- | --- | --- | --- | --- |
| | | Precision | Stability | Machined surface | Chattering noise |
| 1 | 2 | X | X | X | X |
| 2 | 4 | Δ | X | Δ | Δ |
| 3 | 6.7 | ○ | Δ | ○ | ○ |
| 4 | 9 | ⊚ | ○ | ⊚ | ⊚ |
| 5 | 10 | ⊚ | ⊚ | ⊚ | ⊚ |
| 6 | 11 | ⊚ | ○ | ⊚ | ⊚ |
| 7 | 13.4 | ○ | Δ | ○ | ○ |
| 8 | 16 | X | X | X | X |

Figure 6:
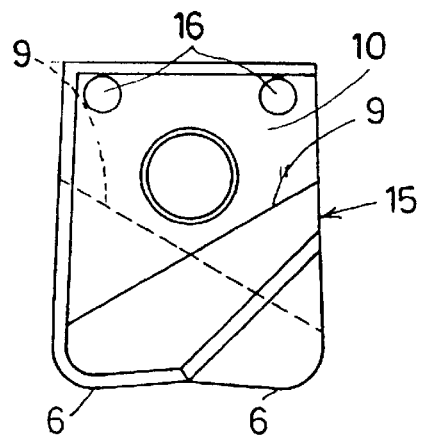
FIG. 6 is a plan view of a different version of the above-described tip.
Figure 7:
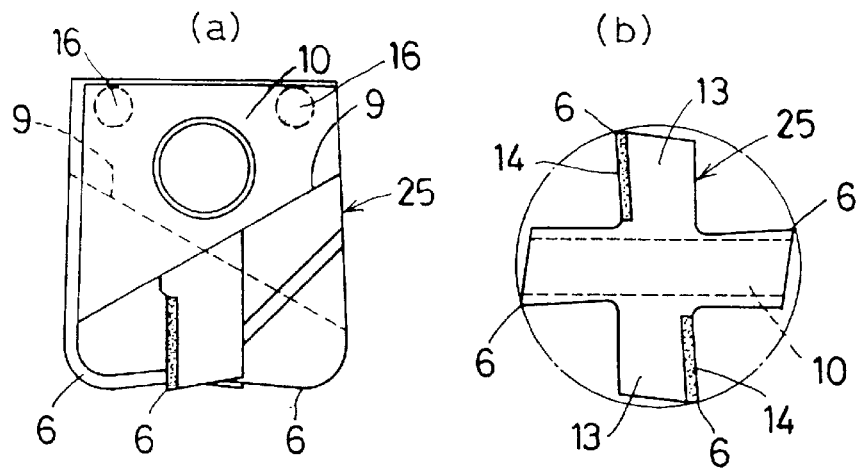
FIG. 7(a) is a plan view of a hybrid tip for a multiple-cutting-edge end mill.
FIG. 7(b) is a front view of the hybrid tip.
Figure 8:
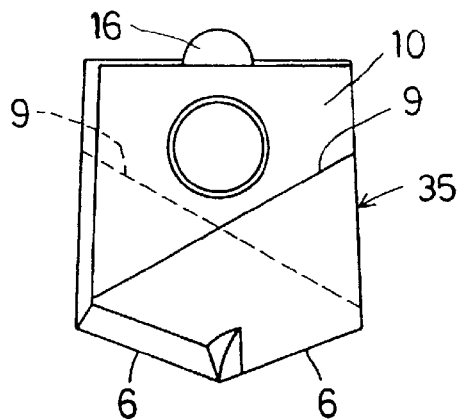
FIG. 8 is a plan view of a tip for a drill.
Figure 9:
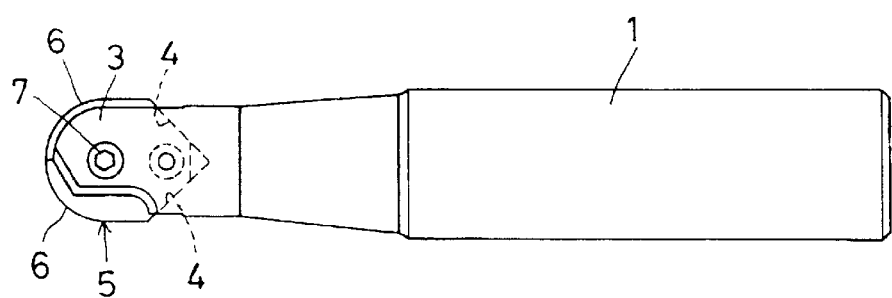
FIG. 9 is a plan view of a conventional tool.
Figure 10:
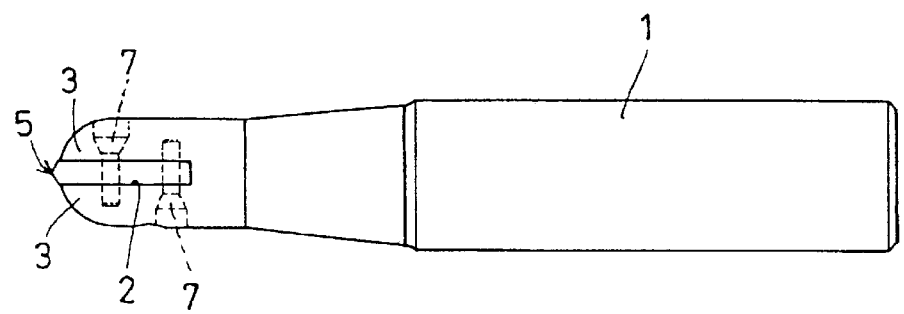
FIG. 10 is a side view of the tool shown in FIG. 9.

FIGS. 6 to 8 are examples of different versions of the above-described tip. FIG. 6 shows a tip 15 having cutting edges 6 with a shape modified from the above-described tip. When the tip 15 or a tip having cutting edges with a squared corner is inserted into the holder 1 shown in FIG. 1, a radius- or square-end mill can be produced.

FIGS. 7(a) and 7(b) show a tip 25 having, at the front-end portion, projected portions 13 in the direction to increase the thickness. The projected portions 13, also, have a cutting edge. When the tip 25 is inserted into the holder 1 shown in FIG. 1, a multiple-cutting-edge radius-end mill can be produced, which has high machining efficiency. The multiple-cutting-edge end mill can also have balled cutting edges or square-cornered cutting edges.

FIG. 8 shows a tip 35, wherein cutting edges 6 having a crest-end shape with an end-cutting angle are provided axis-symmetrically. When the tip 35 is inserted into the holder 1 shown in FIG. 1, a tip-changeable drill can be produced.

These tips shown in FIGS. 6 to 8, also, have engaging faces 9 to be coupled with the holder 1 shown in FIG. 1. They therefore have the effect of the present invention. As described above, tips can have various shapes and cutting edges according to their use.

FIGS. 7(a) and 7(b) show a tip having an increased number of cutting edges. With such a tip, a super hard material 14 made of, for example, a high-pressure high-temperature sintered body can be brazed partially. The super hard material is used to form some of the cutting edges. This type of tip can produce a hybrid-type tool having excellent cost efficiency and machining efficiency.

In addition, the above-described tips have at least one machining-stabilizing part 16 at the portion to be inserted into the groove of a holder. Having the same height as that of the front portion, the part 16 enables the tip to be parallel to the supporting plane. Consequently, the tip can be set stably on the supporting plane when the engaging faces 9 are machined. This stability facilitates the machining with increased precision. The machining-stabilizing part 16 may be provided at both sides of the tip. FIG. 8 shows such an example.

INDUSTRIAL APPLICABILITY

As explained above, the rotary cutting tool of the present invention has locking faces facing forward obliquely at the front end of the holder (front ends of the two jaws). The locking faces cross each other at a position a certain distance away from the front end of the tool to lock the engaging faces provided at some longitudinal midpoint position of the tip. This structure suppresses the runout deviation of the tip while the machining is performed. As a result, the displacements of the cutting edges due to the runout deviation can also be reduced to a small degree, and the machining precision is increased.

The locking faces can be machined without restriction, so the product precision is increased. Because the tip is locked at a location remote from the cutting faces, a large chip pocket can be provided.

The thickness of the tip's portion where the cutting edges are formed can be increased without restriction. This increased thickness enables the design of the cutting edges to have an ideal shape. Furthermore, it is possible to increase the number of cutting edges and to provide a hybrid tool. These structures improve the cutting performance and machining efficiency.

Because the locking faces are slanted in opposite directions at the jaws at the front end of the holder, the tip can secure a centripetal effect and is set without difficulty.

In addition, the tip having a machining-stabilizing part facilitates the machining of the engaging faces, increasing the machining precision.

What is claimed is:

1. A tip-changeable rotary cutting tool comprising:

a holder has at its front end a groove cutting across the center of the holder;

a tip having axis-symmetrically arranged cutting edges inserted into the groove;

the holder has jaws formed on opposite sides of the groove;

the tip is tightly sandwiched between the jaws; and the tip can be removed from the jaws for replacement, the cutting tool being characterized by the conditions that:

each of the jaws has a locking face at its front end;

the locking faces face forward obliquely;

the locking faces cross each other at a position a specific distance away from the front end of the tool when viewed in a plan view of the holder;

the specific distance is defined as about one-third to two-thirds the width of the tip;

each of the two main faces has an engaging face;

the engaging faces protrude from the tip such that they increase the thickness of the tip;

the engaging faces face backward obliquely so that they can be engaged with the corresponding locking faces; and the locking faces lock the engaging faces.

2. A tip-changeable rotary cutting tool as defined in claim 1, wherein:

the tip' front-end portion from the engaging faces to the cutting edges has a thickness larger than that of the tip's portion to be inserted into the groove; and the tip's portion to be inserted into the groove has at least one projected part having the same height as that of the tip's front-end portion.

3. A tip-changeable rotary cutting tool as defined in claim 1 or 2, wherein:

the tip's front-end portion from the engaging faces to the cutting edges has at least one projected portion in the direction to increase the thickness; and the projected portion is provided with a cutting edge.

4. A tip-changeable rotary cutting tool as defined in claim 1 or 2, wherein the specific distance is defined as about one-half the width of the tip.

5. A tip-changeable rotary cutting tool as defined in claim 1 or 2, wherein the specific distance is between about 6.7 mm and 13.4 mm.

6. A tip-changeable rotary cutting tool as defined in claim 1 or 2, wherein the specific distance is between about 9 mm and 11 mm.

7. A tip-changeable rotary cutting tool as defined in claim 5, wherein said width of said tip is about 20 mm.

8. A tip-changeable rotary cutting tool as defined in claim 6, wherein said width of said tip is about 20 mm.

9. A tip-changeable rotary cutting tool as defined in claim 3, wherein said projected portion cutting edge comprises a hardened portion.

* * * * *